Oct. 25, 1932.                J. D. SMALL                1,884,313
CENTRIFUGAL METHOD AND APPARATUS FOR MAKING SOLID CARBON DIOXIDE
Filed Dec. 19, 1929
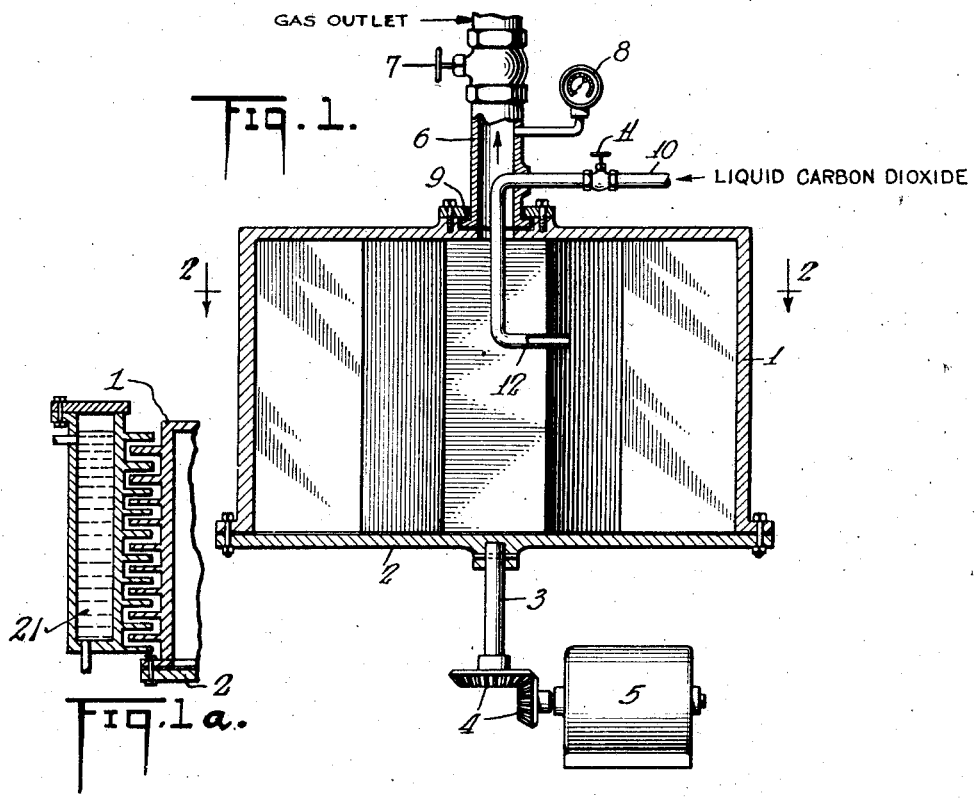
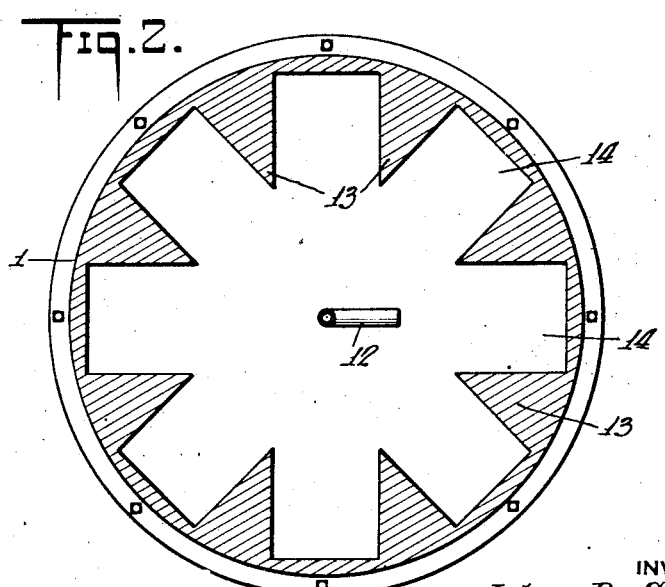
INVENTOR
John D. Small
BY
ATTORNEY Patented Oct. 25, 1932

1,884,313

UNITED STATES PATENT OFFICE

JOHN D. SMALL, OF DOUGLASTON, NEW YORK, ASSIGNOR TO DRYICE CORPORATION OF AMERICA, OF NEW YORK, N. Y., A CORPORATION OF DELAWARE

CENTRIFUGAL METHOD AND APPARATUS FOR MAKING SOLID CARBON DIOXIDE

Application filed December 19, 1929. Serial No. 415,146.

My present invention relates to methods of and apparatus for the conversion of liquid carbon dioxide to solid carbon dioxide.

The main object of my invention is to utilize centrifugal force in order to obtain a commercial quality of solid carbon dioxide.

Other objects of my invention are to simplify and cheapen the process of converting liquid carbon dioxide to solid carbon dioxide.

Solid carbon dioxide is usually made from fine gritty crystals produced by the rapid expansion of liquid carbon dioxide to approximately atmospheric pressure. Crystals of solid carbon dioxide of this type can only be made to slide or flow with great difficulty.

In my co-pending application jointly with Charles L. Jones, Ser. No. 350,588, new forms of solid carbon dioxide are described, including crystal forms that can be made to flow or slide with much greater ease.

I have found that solid carbon dioxide crystals may also be caused to flow or slide with greater ease if lubricated with liquid carbon dioxide. For example, a mass of solid carbon dioxide crystals mixed with liquid carbon dioxide will form a slush. The consistency of this slush will depend upon the proportion of liquid carbon dioxide to solid carbon dioxide present. The greater the proportion of solid carbon dioxide present, the "stiffer" or more viscous will be the consistency of the mass. The word "viscous" is used herein to mean "resistant to flowing or sliding motion." The greater the proportion of liquid carbon dioxide present, the less stiff or viscous will be the consistency of the mass. Obviously also, the viscous quality of the mass will also vary according to the type of solid carbon dioxide crystal used.

I have found that solid carbon dioxide crystals lubricated with liquid carbon dioxide may be caused to flow or slide by a centrifugal force and by this means to be compacted into dense cakes of solid carbon dioxide of commercial quality. I have found, moreover, that with certain forms of solid carbon dioxide crystals, no liquid carbon dioxide is needed as a lubricant. Such crystals may be larger than are formed by the usual methods; or crystals in plate or leaf form, for example, such as are described in said copending application, as contrasted with the hard gritty crystals usually formed.

Thus, my present invention includes making or forming a mixture or slush of crystal and liquid carbon dioxide of desired consistency, preferably forms of crystals of solid carbon dioxide that will flow or slide easily; and subjecting such crystals, or such mixture, to centrifugal force and thereby forming solid carbon dioxide of commercial compactness, any liquid carbon dioxide being evaporated preferably while the centrifugal force is being exerted.

The above and other features of my invention will be more evident from the detailed description in connection with the accompanying drawing, in which Fig. 1 is a diagrammatic vertical section indicating apparatus for practice of my invention;

Fig. 1a is a similar view but fragmental and showing a modification; and

Fig. 2 is a horizontal section on the line 2—2, Fig. 1.

I have shown the apparatus in diagrammatic form, because I believe my invention is broadly new in the art and I do not wish to be limited to details of any particular structure. There are a great number of equivalent workable structures which may be utilized to practice my invention and which can be readily constructed by one skilled in the art, without need of structural details other than described herein.

In the drawing the apparatus is indicated as comprising a hollow rotor 1, having an end closure 2 removably bolted thereto and mounted, by any suitable means, for rotation on its axis, through shaft 3 driven by any suitable means as, for instance, gears 4, actuated by suitable driving means indicated as a motor 5.

The vessel 1 may be of any desired size, strength or material, but is preferably constructed symmetrically and in running balance with respect to its axis of rotation and is preferably capable of safely withstanding an internal fluid pressure of 200 pounds or more per square inch, although, as will be explained, I prefer to operate at substantially lower internal pressures.

The conduits for introducing liquid carbon dioxide and for withdrawing the gas are preferably axially arranged. In the drawing the stationary gas exhaust pipe 6, controlled by valve 7 and having a pressure gauge 8, is stationary with its axis coincident with the axis of vessel 1, the connection being through any suitable gastight form of swivel diagrammatically represented at 9. The supply pipe 10, controlled by valve 11, extends through the wall of pipe 6, thence downward into vessel 1 and preferably terminates in a laterally directed discharge portion 12.

In its simplest form, the interior of vessel 1 would be cylindrical, in which case the solid carbon dioxide would be formed on the peripheral wall in a single cylindrical sheet. In such case, the product would have to be broken up for removal and would require compression in ordinary molds if regularly formed cakes of commercial density are desired. As shown in the drawing, however, the periphery of the vessel 1 is provided with V-shaped partition elements 13, so that the pockets or cavities 14 are parallel sided, rectangular and flat bottom. Thus formed, the solid product will be in rectangular blocks, and by making the pockets square and building up the solid to a required thickness, the blocks may be made cubical.

The liquid supply pipe 10 is connected with any suitable source of supply as, for instance, a storage tank filled with liquid carbon dioxide or preferably with the output of a liquefying plant.

The gas off-take pipe 6, may deliver the gas to any desired destination, but in commercial practice this pipe will normally lead back to the compressors for reliquefying.

The liquid carbon dioxide is delivered to pipe 10 at any desired pressure and temperature within the range that will insure its being in the liquid state, but preferably it will be precooled either by refrigeration or evaporation down to a point as near as practical to freezing. This will permit a correspondingly low pressure in the chamber 1, while yet insuring delivery of the carbon dioxide through the pipe 12 against a counterpressure sufficient to insure the liquid condition. The discharge pipe 12 may be constricted or not, as desired. In some cases I may prefer to have the discharge 12 directed in a radial plane at right angles to the axis of rotation, but it is evident that it may be offset and turned either tangentially in the direction of rotation of the rotary vessel 1, or otherwise.

The details of operation of the apparatus diagrammatically shown in Fig. 1 may be widely varied in practice, but the operation must be so conducted that the crystals of solid carbon dioxide, whether lubricated with liquid carbon dioxide, or not, will slip, slide or flow, when subjected to centrifugal force, sufficiently to permit solid carbon dioxide to be compacted, around the periphery, either into a series of individual blocks or into a band.

According to one desirable method of operation, the vessel 1, is rotated at comparatively slow speed. Liquid carbon dioxide control means 11, is opened and liquid carbon dioxide is discharged through discharge outlet 12. At first, the exhaust control means 7, is preferably adjusted so as to maintain an internal pressure of about 40 or 50 pounds. This takes effect as a back pressure on the liquid discharge at 12, so that the expansion at the jet is to a pressure near but below triple point. Under such condition, the incoming jet of liquid is immediately completely converted to dry solid and dry gas. After a desired amount of the dry solid carbon dioxide has been formed, I prefer to adjust the exhaust control means 7 so as to raise the internal pressure to near triple point pressure, preferably somewhat above it, so that a substantial amount of the incoming carbon dioxide remains in liquid form. At this time, I prefer to increase the speed of rotation of vessel 1. When a desired weight of liquid carbon dioxide has been supplied to vessel 1, the liquid control means 11 is closed.

I prefer then to vary the pressure in vessel 1, by suitable adjustment of the exhaust control 7, above and below the triple point until all the liquid carbon dioxide within vessel 1 is converted either to solid or gas. Thereafter, I prefer to further reduce the pressure again by adjustment of 7, to any desired point, and I contemplate, in some instances, exhausting the pressure below atmospheric pressure. In most cases it is simpler merely to reduce the pressure to a point slightly above atmospheric pressure. When the interior of the vessel is at or near normal atmospheric pressure, the end closure 2 is removed and the solid carbon dioxide removed therefrom.

There are many possible variations in handling pressure conditions within vessel 1. For example, I contemplate, in some cases, introducing all the carbon dioxide into the whirling vessel 1, against an internal pressure above the triple point, so that the expansion operates merely to cool the discharged liquid, without forming any solid. Thereafter, the pressure is reduced slowly or rapidly, as desired, permitting the liquid carbon dioxide to boil off at a desired rate, until the charge is completely converted to dry gas and solid.

I also contemplate introducing all the liquid into vessel 1, in liquid form, and freezing this liquid by external means, while vessel 1 is being rotated; or the liquid may be partly boiled off while part of it is being thus frozen by external means. A simple form of freezer, as indicated in Fig. 1a, may include radial fins on the exterior of rotor 1, overlapping similar fins on a tank kept cold by circulation of a suitable refrigerant which may be supplied through pipes as shown. However, there are innumerable ways in which the mold may be cooled independently of the internal evaporation.

I also contemplate boiling the liquid, or otherwise reducing its temperature to or near the triple point and its pressure only slightly above said point, as a preliminary step, before discharging it through the supply pipe 10. In such case, the boiling may be carried to a point producing solidified particles in the liquid supply, provided care be taken to avoid clogging. If such precooled liquid, be discharged at slightly above triple point, into the chamber 1 while the latter is maintained only slightly below triple point pressure, the expansion and gasifying of the supply stream will be relatively slow, permitting direct deposit of ice coatings built up on the inner surfaces of the chamber. In such case the final disappearance of the liquid may coincide with or overlap but slightly the deposit thereof. In this way a coherent coating may be built up without presence of any appreciable amount of liquid in the molds, during the process.

I claim:—

1. A method of compacting solid carbon dioxide, which includes forming a mixture of crystal and liquid carbon dioxide while maintaining pressure at or above the triple point; subjecting the wet mixture to centrifugal force; and drying the mixture.

2. A method of compacting solid carbon dioxide, which includes forming a mixture of crystal and liquid carbon dioxide while maintaining pressure at or above the triple point; subjecting the wet mixture to centrifugal force; and drying the mixture while subjected to said force.

3. A method of compacting solid carbon dioxide, which includes forming a mixture of crystal and liquid carbon dioxide while maintaining pressure at or above the triple point; subjecting the wet mixture to centrifugal force; and while subjected to said force, boiling off liquid at reduced pressure.

4. A method of compacting solid carbon dioxide, which includes forming a mixture of crystal and liquid carbon dioxide while maintaining pressure at or above the triple point; subjecting the wet mixture to centrifugal force; and drying the mixture while subjected to said force, by boiling off the liquid slowly.

5. A method of compacting solid carbon dioxide crystals, which includes subjecting them to centrifugal force while subjecting them to gaseous pressure approximating triple point pressure.

6. A method of compacting solid carbon dioxide, which includes the steps of lubricating subdivided solid carbon dioxide with liquid carbon dioxide, compacting the solid by centrifugal force and removing the liquid.

7. A method of manufacturing blocks of solid carbon dioxide, which includes subjecting liquid carbon dioxide, in block molds, to centrifugal force while boiling off said liquid at approximately triple point pressure.

8. A method of producing molded blocks of solid carbon dioxide, which includes rotating peripherally arranged molds having the desired block form, to subject them to centrifugal force while maintaining gaseous pressure therein above triple point pressure; utilizing said force to hold in the molds, carbon dioxide in both liquid and solid forms; and while subjected to said force, solidifying the contents of the molds, by boiling off liquid at reduced pressure.

9. A method of producing molded blocks of solid carbon dioxide, which includes rotating peripherally arranged molds having the desired block form, to subject them to centrifugal force while maintaining gaseous pressure therein above triple point pressure; utilizing said force to hold in the molds, carbon dioxide in both liquid and solid forms; and while subjected to said force, solidifying the contents of the molds, by boiling off the liquid slowly.

10. A method of manufacturing solid carbon dioxide, which includes boiling liquid carbon dioxide while said liquid carbon dioxide is being subjected to centrifugal force.

11. A method of compacting solid carbon dioxide, which includes forming a mixture of crystal and liquid carbon dioxide while maintaining pressure at or above the triple point; subjecting the wet mixture to centrifugal force; and while subjected to such force reducing the pressure, thereby converting the remaining liquid carbon dioxide to gaseous and solid carbon dioxide.

12. A method of forming solid carbon dioxide, which includes subjecting liquid carbon dioxide to centrifugal force, while freezing said liquid carbon dioxide, by external means.

13. A method of forming solid carbon dioxide, which includes subjecting liquid carbon dioxide to centrifugal force while freezing said liquid carbon dioxide by means other than the cooling effect of its own expansion.

Signed at New York, in the county of New York, and State of New York, this 16th day of December, A. D. 1929.

JOHN D. SMALL.